(12) United States Patent
Chao et al.

(10) Patent No.: US 8,970,792 B2
(45) Date of Patent: Mar. 3, 2015

(54) REMOTE CONTROLLER AND REMOTE CONTROLLER SET APPLIED TO DISPLAY DEVICE

(71) Applicant: Browan Communications Inc., New Taipei (TW)

(72) Inventors: Yung-Hua Chao, Hsinchu (TW); Hui-Jung Hu, Taoyuan County (TW)

(73) Assignee: Browan Communications Inc., Banqiao Dist., New Taipei (TW)

( * ) Notice: Subject to any disclaimer, the term of this patent is extended or adjusted under 35 U.S.C. 154(b) by 16 days.

(21) Appl. No.: 13/943,777

(22) Filed: Jul. 16, 2013

(65) Prior Publication Data

US 2015/0022724 A1   Jan. 22, 2015

(51) Int. Cl.
*H04N 5/44* (2011.01)

(52) U.S. Cl.
CPC .................................. *H04N 5/4403* (2013.01)
USPC .......................................... 348/734; 348/725

(58) Field of Classification Search
USPC ........................................................ 348/734
See application file for complete search history.

(56) References Cited

U.S. PATENT DOCUMENTS

| 8,655,666 | B2 * | 2/2014 | Sureka et al. | 704/270.1 |
| 2006/0028582 | A1 * | 2/2006 | Zahn | 348/552 |
| 2011/0285920 | A1 * | 11/2011 | Takizawa et al. | 348/734 |
| 2012/0119873 | A1 * | 5/2012 | Ramsdell et al. | 340/4.3 |

* cited by examiner

*Primary Examiner* — Jefferey Harold
*Assistant Examiner* — Justin Sanders
(74) *Attorney, Agent, or Firm* — Winston Hsu; Scott Margo

(57) ABSTRACT

A remote controller applied to a display device includes a wireless communication element, a voice receiving and transmitting element and a control unit. The wireless communication element is utilized for performing a wireless communication with a set-up box of the display device. The control unit is coupled to the wireless communication element and the voice receiving and transmitting element, and is utilized for controlling a voice communication between the wireless communication element and the set-up box. When the remote controller does not need to have the voice communication and any other communication with the set-up box, the control unit disables the wireless communication element to make the wireless communication element be unable to receive and process any information from the set-up box.

8 Claims, 4 Drawing Sheets a diagram illustrating a remote controller set
REMOTE CONTROLLER AND REMOTE CONTROLLER SET APPLIED TO DISPLAY DEVICE

BACKGROUND OF THE INVENTION

1. Field of the Invention

The present invention relates to a smart television (TV), and more particularly, to a smart TV remote controller and a remote controller set having voice communication functions.

2. Description of the Prior Art

In a conventional wireless IP phone applied to a smart TV, the wireless IP phone is always communicated with a set-up box, and when the set-up box receives an incoming phone call, the wireless IP phone may have ringtone or vibrated alert to remind a user to take the phone call. Therefore, the wireless IP phone constantly suffers low battery problem. To solve the low battery problem, the wireless IP phone is always connected to a recharger to charge a battery of the wireless IP phone when the phone is not used, causing inconvenience to the user.

SUMMARY OF THE INVENTION

It is therefore an objective of the present invention to provide a smart TV remote controller and a remote controller set having voice communication functions, which have very low power consumption, to solve the above-mentioned problem.

According to one embodiment of the present invention, a remote controller applied to a display device includes a wireless communication element, a voice receiving and transmitting element and a control unit. The wireless communication element is utilized for performing a wireless communication with a set-up box of the display device. The control unit is coupled to the wireless communication element and the voice receiving and transmitting element, and is utilized for controlling a voice communication between the wireless communication element and the set-up box. When the remote controller does not need to have the voice communication and any other communication with the set-up box, the control unit disables the wireless communication element to make the wireless communication element be unable to receive and process any information from the set-up box.

According to another embodiment of the present invention, a remote controller set applied to a display device includes a pluggable device and a remote controller. The pluggable device is utilized to be installed on a set-up box of the display device, and the pluggable device comprises a second wireless communication element and a second control unit, where the second control unit is coupled to the second wireless communication element and the set-up box, and is utilized for controlling the second wireless communication element. The remote controller has voice communication function, and the remote controller comprises a first wireless communication element, a voice receiving and transmitting element and a second control unit, where the first wireless communication element is utilized for performing a wireless communication with the second wireless communication element of the pluggable device, and the first control unit is coupled to the first wireless communication element and the voice receiving and transmitting element, and is utilized for controlling a voice communication between the first wireless communication element and the set-up box. When the remote controller does not need to have the voice communication and any other communication with the set-up box, the first control unit disables the first wireless communication element to make the first wireless communication element be unable to receive and process any information from the set-up box.

According to another embodiment of the present invention, a remote controller set applied to a display device includes a set-up box and a remote controller. The set-up box comprises a second wireless communication element and a second control unit, where the second control unit is coupled to the second wireless communication element, and is utilized for controlling the second wireless communication element. The remote controller has voice communication function, and the remote controller comprises a first wireless communication element, a voice receiving and transmitting element and a first control unit, where the first wireless communication element is utilized for performing a wireless communication with the second wireless communication element of the set-up box, and the first control unit is coupled to the first wireless communication element and the voice receiving and transmitting element, and is utilized for controlling a voice communication between the first wireless communication element and the set-up box. When the remote controller does not need to have the voice communication and any other communication with the set-up box, the first control unit disables the first wireless communication element to make the first wireless communication element be unable to receive and process any information from the set-up box.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
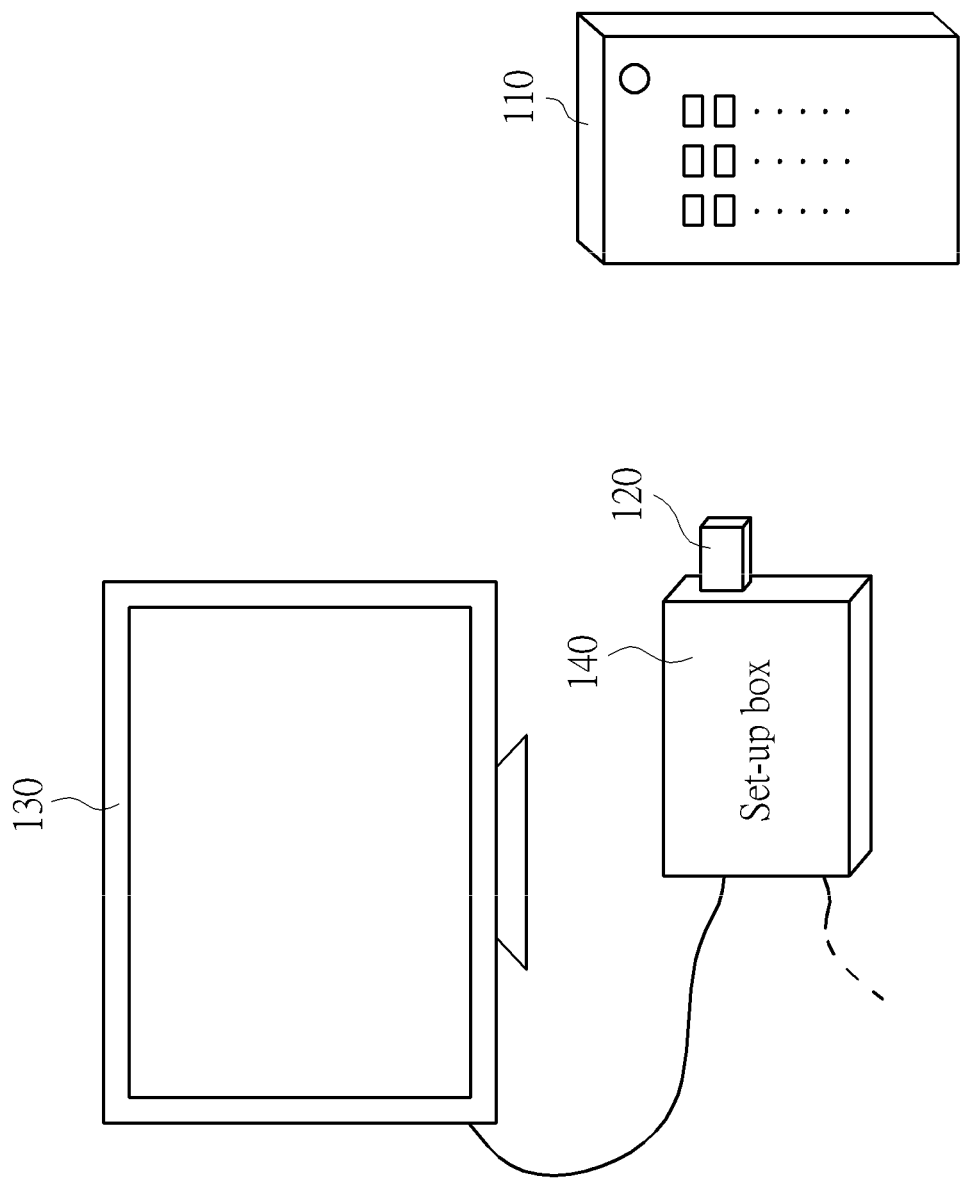
FIG. 1 is a diagram illustrating a remote controller set according to one embodiment of the present invention.

Please refer to FIG. 1, which is a diagram illustrating a remote controller set according to one embodiment of the present invention. As shown in FIG. 1, the remote controller set comprises a remote controller 110 having voice communication function and a pluggable device 120. The pluggable device 120 is connected to a set-up box 140 of a display device (in this embodiment, the display device is a TV 130, but it is not a limitation of the present invention), where the set-up box 140 has an operating system and network connections. By connecting the set-up box 140 to the TV 130, the TV 130 can be operated as a smart TV.

In the embodiment shown in FIG. 1 the set-up box 140 is externally connected to the TV 130, in other embodiments, however, the set-up box 140 can be built in the TV 130. These alternative designs shall fall within the scope of the present invention.

Figure 2:
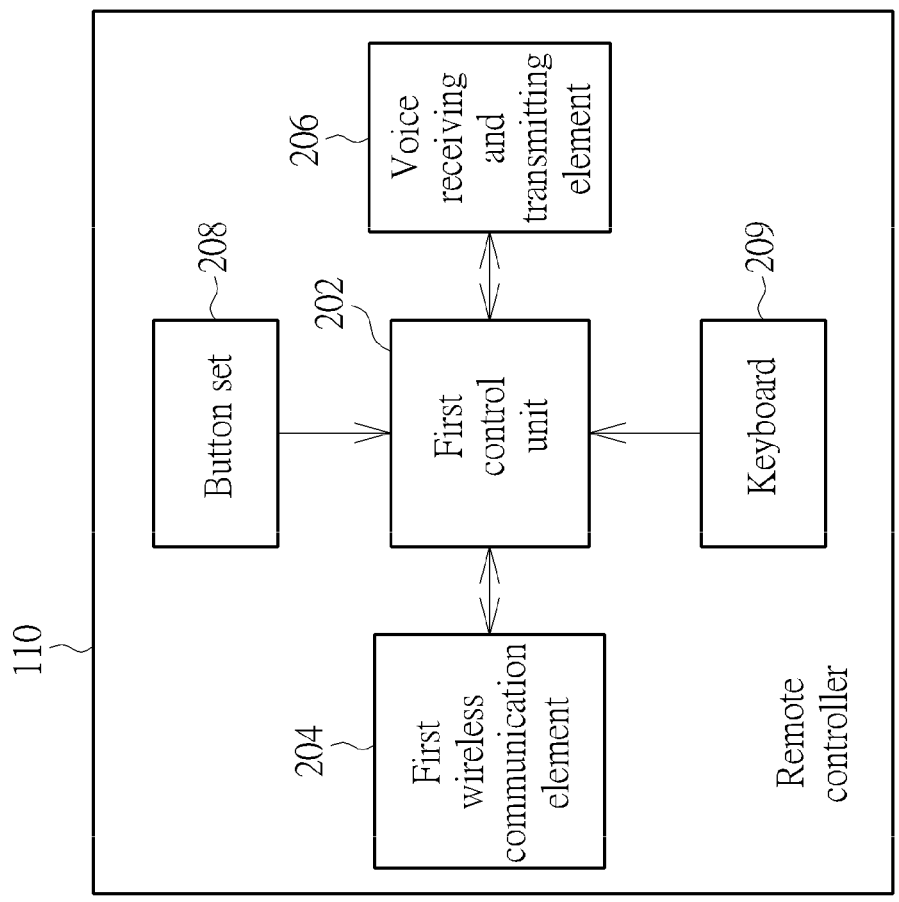
FIG. 2 is a diagram illustrating the remote controller and the pluggable device shown in FIG. 1 according to one embodiment of the present invention.
Figure 2:
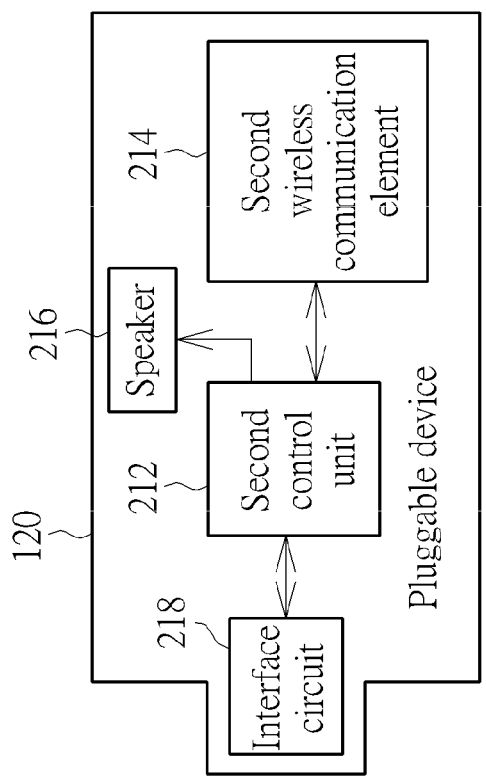

Please refer to FIG. 2, which is a diagram illustrating the remote controller 110 and the pluggable device 120 according to one embodiment of the present invention. As shown in FIG. 2, the remote controller 110 comprises a first control unit 202, a first wireless communication element 204, a voice receiving and transmitting element 206, a button set 208 and a keyboard 209. The first control unit 202 may be implemented by one or more chip sets and/or other associated circuit elements; the first wireless communication element 204 may support one or more of current radio frequency (RF) wireless communication standards; the voice receiving and transmitting element 206 includes a voice receiver and a microphone, and therefore the user can use the remote controller 110 to have phone conversation; the button set 208 and the keyboard 209 can be implemented by physical or virtual keys, and they are for the user to control the set-up box 140 and the TV 130. In addition, the pluggable device 120 comprises a second control unit 212, a second wireless communication element 214, a speaker 216 and an interface circuit 218. The second control unit 212 may be implemented by one or more chip sets and/or other associated circuit elements; the second wireless communication element 214 may support one or more of current RF wireless communication standards, and is able to communicate with the first wireless communication element 204; the speaker 216 can be any element which can produce sounds, especially a beeper having very low power consumption; the interface circuit 218 can be implemented by any interface circuit which can connect to the set-up box 140 and have data communication with the set-up box 140, and in this embodiment, the interface circuit 218 can be a universal serial bus (USB) interface circuit.

In addition, the first wireless communication element 204 can be selectively disabled or enabled. In detail, when the remote controller 110 does not need to have voice communication or any other communication with the set-up box 140, the first control unit 202 can disable the first wireless communication element 204 to make the first wireless communication element 204 be unable to receive and process any information from the set-up box 140 and the pluggable device 120 (i.e. the remote controller 110 cannot receive and process any information from the set-up box 140 and the pluggable device 120) to save power of the remote controller 110. When the user needs to use the remote controller 110 to control the set-up box 140, the user can use the button set 208 to enable the first wireless communication element 204.

For the uses of the remote controller 110 and the pluggable device 120, please refer to FIG. 1 and FIG. 2, first, the user installs the pluggable device 120 on the set-up box 140. At his time, when the user merely wants to control the operations of the set-up box 140 and the user does not need the voice communication, the user can directly input information by using the button set 208 or the keyboard 209, and after the first control unit 202 receives the user inputted information from the button set 208 or the keyboard 209, the first control unit 202 transmits the information to the set-up box 140 via the first wireless communication element 204, the second wireless communication element 214, the second control unit 212 and the interface circuit 218 to control the operations of the set-up box 140 and the TV 130.

In addition, when someone makes a phone call to the user of the set-up box 140, the second control unit 212 can receive this message from the interface circuit 218. At this time, the second control unit 212 starts to control the speaker 216 to produce sounds to remind the user to pick up the phone. Particularly, at this time the first wireless communication element 204 of the remote controller 110 is disabled, that is there is no communication between the remote controller 110 and the pluggable device 120. Then, the user is aware of the incoming call after hearing the sounds, and the user may press a specific button of the button set 208 to enable the first wireless communication element 204 to prepare the phone conversations. In detail, when the first control unit 202 receives the message indicating that the user pressed the specific button, the first control unit 202 will enable the first wireless communication element 204, and the first control unit 202 transmits a message to the second control unit 212 via the first wireless communication element 204 and the second wireless communication element 214 to notify the second control unit 212 to close (disable) the speaker 216. Then, the user can have an IP phone conversation with a remote user by using remote controller 110, the pluggable device 120 and the set-up box 140. Finally, after the IP phone conversation is finished, the first wireless communication element 204 may be automatically disabled by the control from the first control unit 202, or the first wireless communication element 204 may be disabled when the user pressed the specific button again, therefore, the first wireless communication element 204 is unable to receive and process any information from the set-up box 140 and the pluggable device 120 to save power of the remote controller 110.

In light of above, because the remote controller set can remind the user that the user has an incoming phone call by using the speaker 216 built-in the pluggable device 120, the remote controller 110 can be enabled only when the remote controller 110 is required to be used, that is the remote controller 110 itself does not need to be enabled at any time. Therefore, the power of the remote controller 110 can be saved when the remote controller 110 is not used.

In addition, the pluggable device 120 can be designed according to the current system standard such as Android system standard. Therefore, the pluggable device 120 can be installed on any set-up box adopting Android system standard without considering different manufacturers of the set-up box. Therefore, the convenience for the user is increased.

Figure 3:
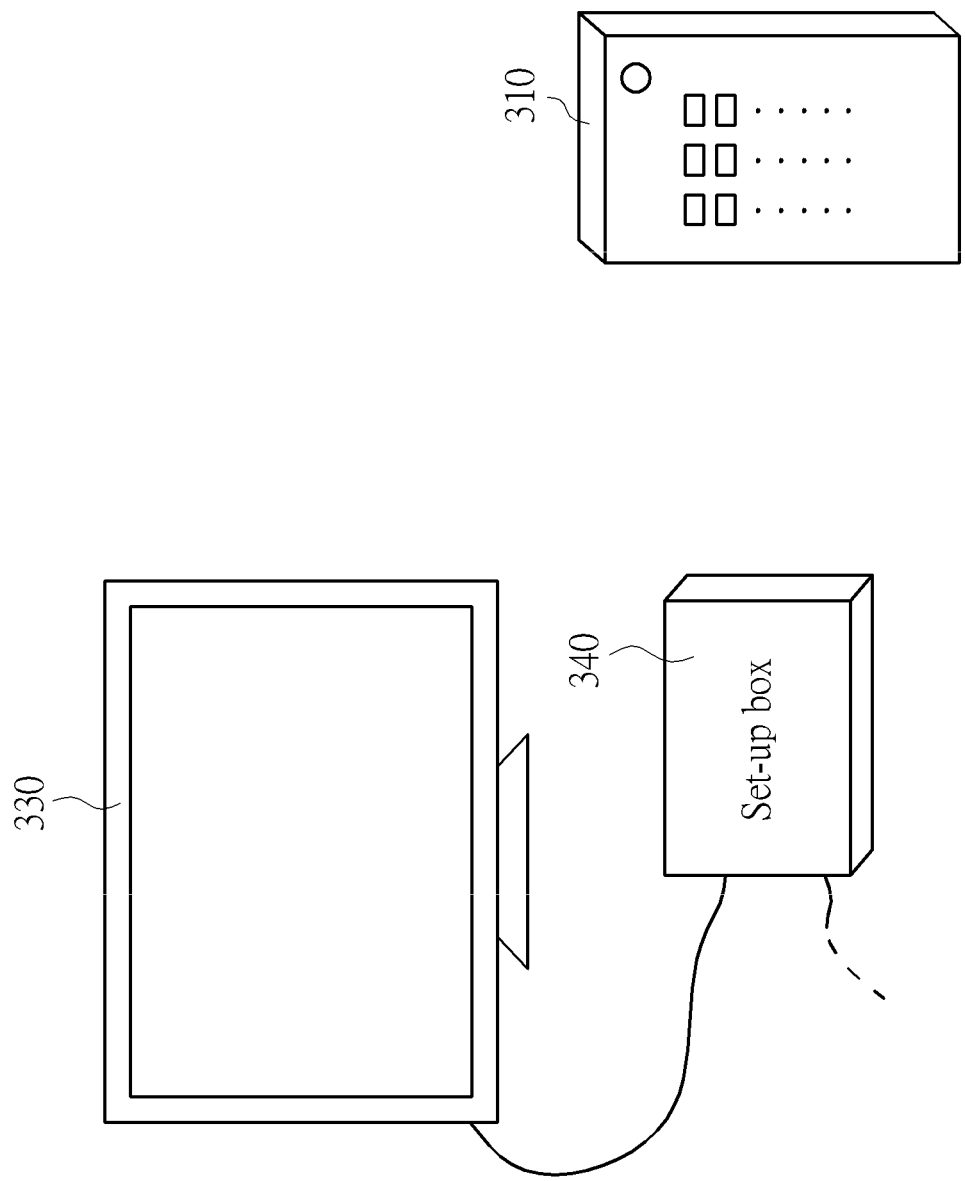
FIG. 3 is a diagram illustrating a remote controller set according to another embodiment of the present invention.

Please refer to FIG. 3, which is a diagram illustrating a remote controller set according to another embodiment of the present invention. As shown in FIG. 3, the remote controller set comprises a remote controller 310 having voice communication function and a set-up box 340. The set-up box 340 is connected to a display device (in this embodiment, the display device is a TV 330, but it is not a limitation of the present invention), where the set-up box 340 has operating system and network connections. By connecting the set-up box 340 to the TV 330, the TV 330 can be operated as a smart TV.

Figure 4:
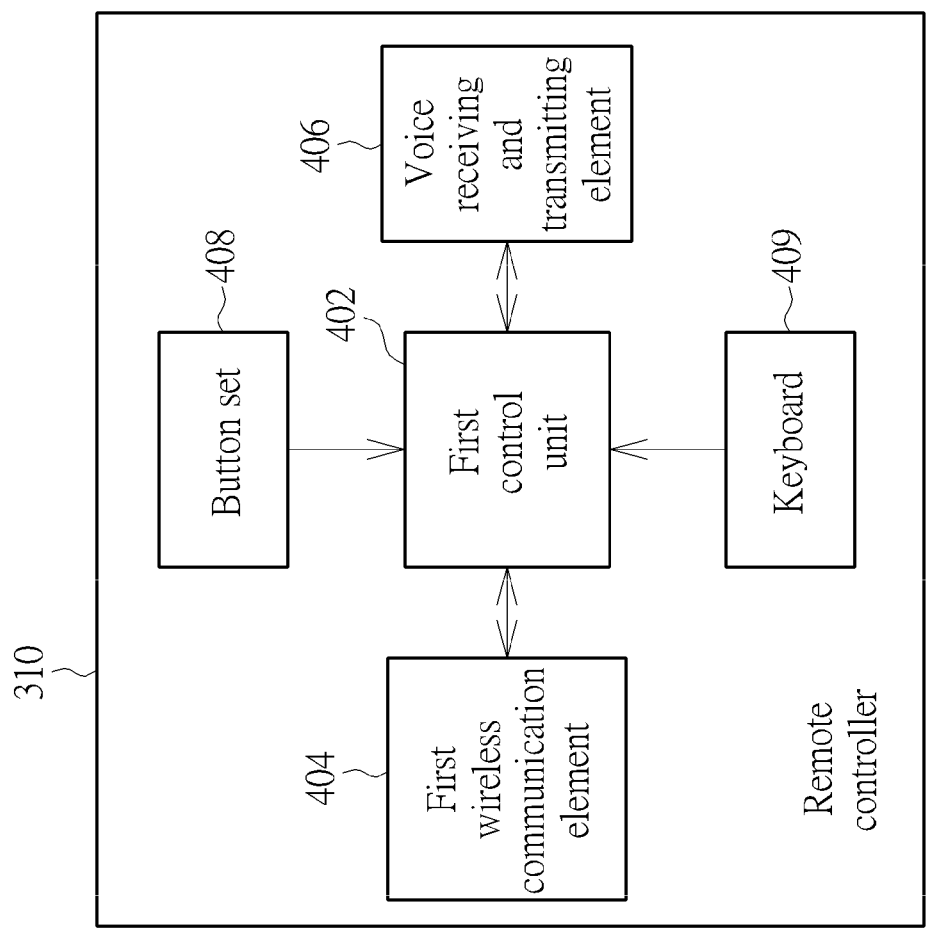
FIG. 4 is a diagram illustrating the remote controller and the set-up box shown in FIG. 3 according to one embodiment of the present invention.
Figure 4:
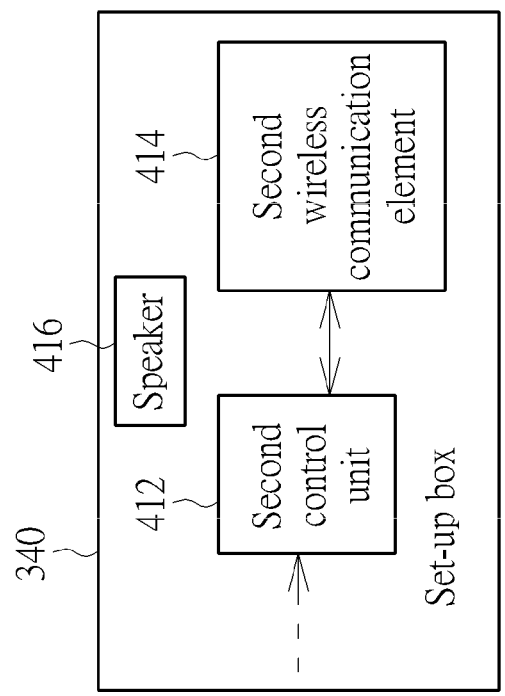

Please refer to FIG. 4, which is a diagram illustrating the remote controller 310 and the set-up box 340 according to one embodiment of the present invention. As shown in FIG. 4, the remote controller 310 comprises a first control unit 402, a first wireless communication element 404, a voice receiving and transmitting element 406, a button set 408 and a keyboard 409. The first control unit 402 may be implemented by one or more chip sets and/or other associated circuit elements; the first wireless communication element 404 may support one or more of current RF wireless communication standards; the voice receiving and transmitting element 406 includes a voice receiver and a microphone, and therefore the user can use the remote controller 310 to have phone conversation; the button set 408 and the keyboard 409 can be implemented by physical or virtual keys, and they are for the user to control the set-up box 340 and the TV 330. In addition, the set-up box 340 comprises a second control unit 412, a second wireless communication element 414 and a speaker 416. The second control unit 412 may be implemented by one or more chip sets and/or other associated circuit elements; the second wireless communication element 414 may support one or more of current RF wireless communication standards, and is able to communicate with the first wireless communication element 404; the speaker 416 can be any element which can produce sounds, especially a beeper having very low power consumption.

It is noted that the set-up box 340 shown in FIG. 4 merely shows the elements related to the embodiment of the present invention. A person skilled in this art should understand that the set-up box 340 has other system control elements and network elements.

In addition, the first wireless communication element 404 can be selectively disabled or enabled. In detail, when the remote controller 310 does not need to have voice communication or other communications with the set-up box 340, the first control unit 402 can disable the first wireless communication element 404 to make the first wireless communication element 404 be unable to receive and process any information from the set-up box 340 (i.e. the remote controller 310 cannot receive and process any information from the set-up box 340) to save power of the remote controller 310. When the user needs to use the remote controller 310 to control the set-up box 340, the user can use the button set 408 to enable the first wireless communication element 404.

The difference between the embodiments shown in FIG. 1 and FIG. 3 is that the set-up box 340 shown in FIG. 3 includes the functions of the pluggable device 120 shown in FIG. 1, and the main operations are substantially the same. In detail, for the uses of the remote controller 310 and the set-up box 340, please refer to FIG. 3 and FIG. 4, first, if the user merely wants to control the operations of the set-up box 340 and the user does not need the voice communication, the user can directly input information by using the button set 408 or the keyboard 409, and after the first control unit 402 receives the user inputted information from the button set 408 or the keyboard 409, the first control unit 402 transmits the information to the set-up box 340 via the first wireless communication element 404 and the second wireless communication element 414 to control the operations of the set-up box 340 and the TV 330.

In addition, when someone makes a phone call to the user of the set-up box 340, the second control unit 412 starts to control the speaker 416 to produce sounds to remind the user to pick up the phone. Particularly, at this time the first wireless communication element 404 of the remote controller 310 is disabled, that is there is no communication between the remote controller 310 and the set-up box 340. Then, the user is aware of the incoming call after hearing the sounds, and the user may press a specific button of the button set 408 to enable the first wireless communication element 404 to prepare the phone conversations. In detail, when the first control unit 402 receives the message indicating that the user pressed the specific button, the first control unit 402 will enable the first wireless communication element 404, and the first control unit 402 transmits a message to the second control unit 412 via the first wireless communication element 404 and the second wireless communication element 414 to notify the second control unit 412 to close (disable) the speaker 416. Then, the user can have an IP phone conversation with a remote user by using remote controller 310 and the set-up box 340. Finally, after the IP phone conversation is finished, the first wireless communication element 404 may be automatically disabled by the control from the first control unit 402, or the first wireless communication element 404 may be disabled when the user pressed the specific button again, therefore, the first wireless communication element 404 is unable to receive and process any information from the set-up box 340 to save power of the remote controller 310.

In light of above, because the remote controller set can remind the user that the user has an incoming phone call by using the speaker 416 built-in the set-up box 340, the remote controller 310 can be enabled only when the remote controller 310 is required to be used, that is the remote controller 310 itself does not need to be enabled at any time. Therefore, the power of the remote controller 310 can be saved when the remote controller 310 is not used.

Briefly summarized, in the remote controller and the remote controller set of the present invention, because the remote controller set can remind the user that the user has an incoming phone call by using the speaker built-in the set-up box or the pluggable device, the remote controller can be enabled only when it is required to be used, that is the remote controller itself does not need to be enabled at any time. Therefore, the power of the remote controller can be saved when the remote controller is not used.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A remote controller set applied to a display device, comprising:
   a pluggable device, wherein the pluggable device is utilized to be installed on a set-up box of the display device, and the pluggable device comprises:
      a second wireless communication element;
      a second control unit, coupled to the second wireless communication element and the set-up box, for controlling the second wireless communication element; and
      a speaker, coupled to the second control unit; and
   a remote controller having voice communication function, comprising:
      a first wireless communication element, for performing a wireless communication with the second wireless communication element of the pluggable device;
      a voice receiving and transmitting element; and
      a first control unit, coupled to the first wireless communication element and the voice receiving and transmitting element, for controlling a voice communication between the first wireless communication element and the set-up box;
   wherein when the remote controller does not have the voice communication or any other communication with the set-up box, the first control unit disables the first wireless communication element to make the first wireless communication element be unable to receive and process any information from the set-up box; and when the set-up box notifies the second control unit that someone makes a phone call to the set-up box, the second control unit controls the speaker to produce sounds.

2. The remote controller set of claim 1, wherein the remote controller further comprises:

a button, coupled to the first control unit, for receiving a user's pressing input;
wherein the first control unit determines whether the remote controller needs to have the voice communication with the set-up box according to the user's pressing input to selectively disable the first wireless communication element or enable the first wireless communication element.

3. The remote controller set of claim 1, wherein the display device is a smart TV.

4. The remote controller set of claim 1, wherein the speaker is a beeper.

5. A remote controller set applied to a display device, comprising:
a set-up box, comprising:
a second wireless communication element;
a second control unit, coupled to the second wireless communication element and the set-up box, for controlling the second wireless communication element; and
a speaker, coupled to the second control unit; and
a remote controller having voice communication function, comprising:
a first wireless communication element, for performing a wireless communication with the second wireless communication element of the set-up box;
a voice receiving and transmitting element; and
a first control unit, coupled to the first wireless communication element and the voice receiving and transmitting element, for controlling a voice communication between the first wireless communication element and the set-up box;
wherein when the remote controller does not have the voice communication or any other communication with the set-up box, the first control unit disables the first wireless communication element to make the first wireless communication element be unable to receive and process any information from the set-up box; and when the set-up box notifies the second control unit that someone makes a phone call to the set-up box, the second control unit controls the speaker to produce sounds.

6. The remote controller set of claim 5, wherein the remote controller further comprises:
a button, coupled to the first control unit, for receiving a user's pressing input;
wherein the first control unit determines whether the remote controller needs to have the voice communication with the set-up box according to the user's pressing input to selectively disable the first wireless communication element or enable the first wireless communication element.

7. The remote controller set of claim 5, wherein the display device is a smart TV.

8. The remote controller set of claim 5, wherein the speaker is a beeper.

* * * * *